United States Patent [19]

Chen

[11] Patent Number: 5,470,278
[45] Date of Patent: Nov. 28, 1995

[54] ADJUSTABLE DEVICE FOR TENSIONING A BICYCLE DRIVE CHAIN

[76] Inventor: Tse-Min Chen, P.O. Box 1750, Taichung, Taiwan

[21] Appl. No.: 370,416

[22] Filed: Jan. 9, 1995

[51] Int. Cl.[6] .................................................. F16H 7/12
[52] U.S. Cl. ................................................................ 474/133
[58] Field of Search ................................. 474/101, 109, 474/133, 136, 140, 273

[56] References Cited

U.S. PATENT DOCUMENTS

| | | | |
|---|---|---|---|
| 2,466,495 | 4/1949 | Slemmons | 474/133 X |
| 2,632,335 | 3/1953 | Ciaccio | 474/133 |
| 3,545,294 | 12/1970 | Dankowski | 474/133 X |
| 3,665,780 | 5/1972 | Lunenschloss | 474/133 |
| 4,098,136 | 7/1978 | Wicker et al. | 474/133 X |

*Primary Examiner*—Roger J. Schoeppel

[57] ABSTRACT

An adjustable device for pressing a bicycle drive chain includes an adjustable pressing wheel pivoted to an adjustable and expansible shaft fastened to one end of a fastening seat. The pressing wheel can be so tilted as to press effectively the bicycle drive chain.

2 Claims, 6 Drawing Sheets

5,470,278

ADJUSTABLE DEVICE FOR TENSIONING A BICYCLE DRIVE CHAIN

FIELD OF THE INVENTION

The present invention relates generally to a bicycle drive chain, and more particularly to an adjustable device for pressing the bicycle drive chain.

BACKGROUND OF THE INVENTION

As shown in FIG. 1, the speed changing device of a conventional bicycle is provided with a guide seat 1 for guiding a drive chain 11, and with a pressing wheel 132 which is mounted on a threaded column 131 of a pressing frame 13 pivoted to a side frame 12. The pressing wheel 132 is intended to guide and press the drive chain 11. Such a prior art device for pressing a bicycle drive chain as described above is fixed and is therefore impractical.

SUMMARY OF THE INVENTION

It is therefore the primary objective of the present invention to provide an adjustable device for pressing a bicycle drive chain, which comprises an adjustable pressing wheel pivoted to an adjustable and expansible shaft fastened to one end of a fastening seat.

The foregoing objective, features and advantages of the present invention will be more readily understood upon a thoughtful deliberation of the following detailed description of the present invention in conjunction with the accompanying drawings.

DETAILED DESCRIPTION OF THE EMBODIMENTS

Figure 1:
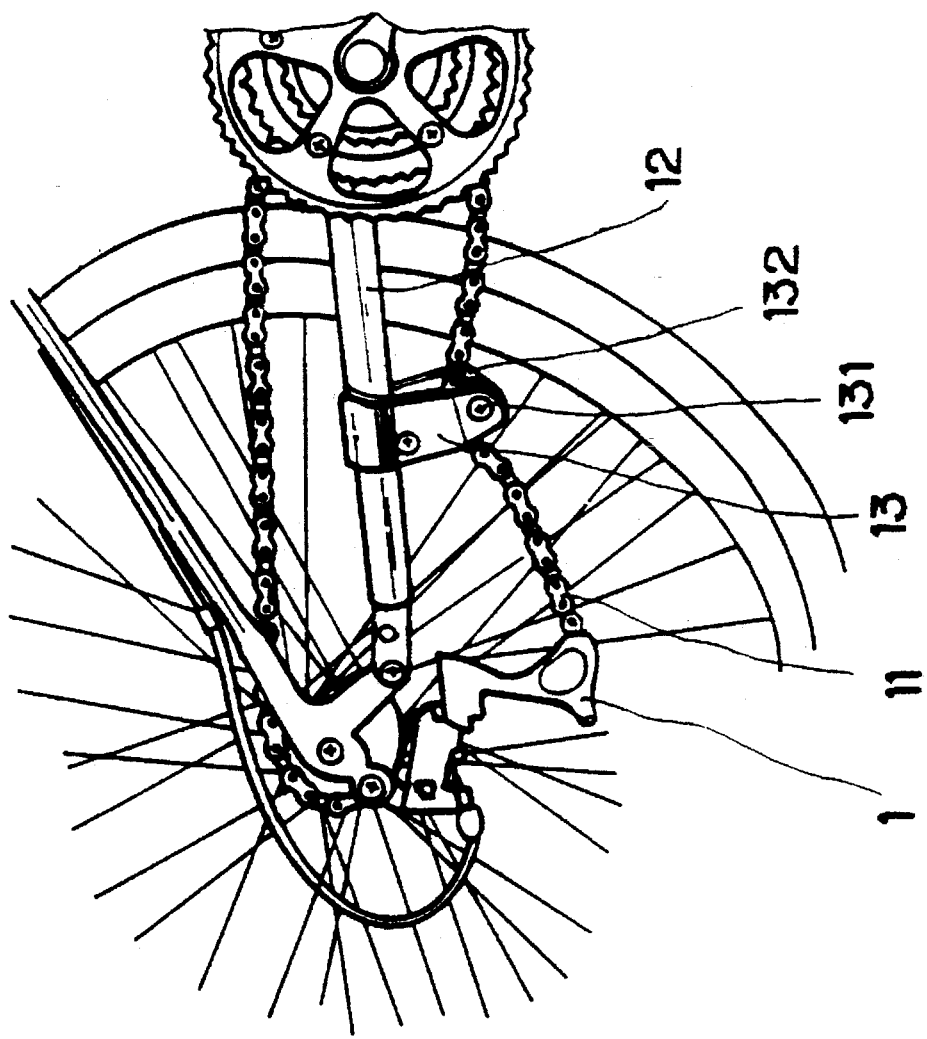
FIG. 1 shows a schematic view of a prior art device for pressing a bicycle drive chain.
Figure 2:
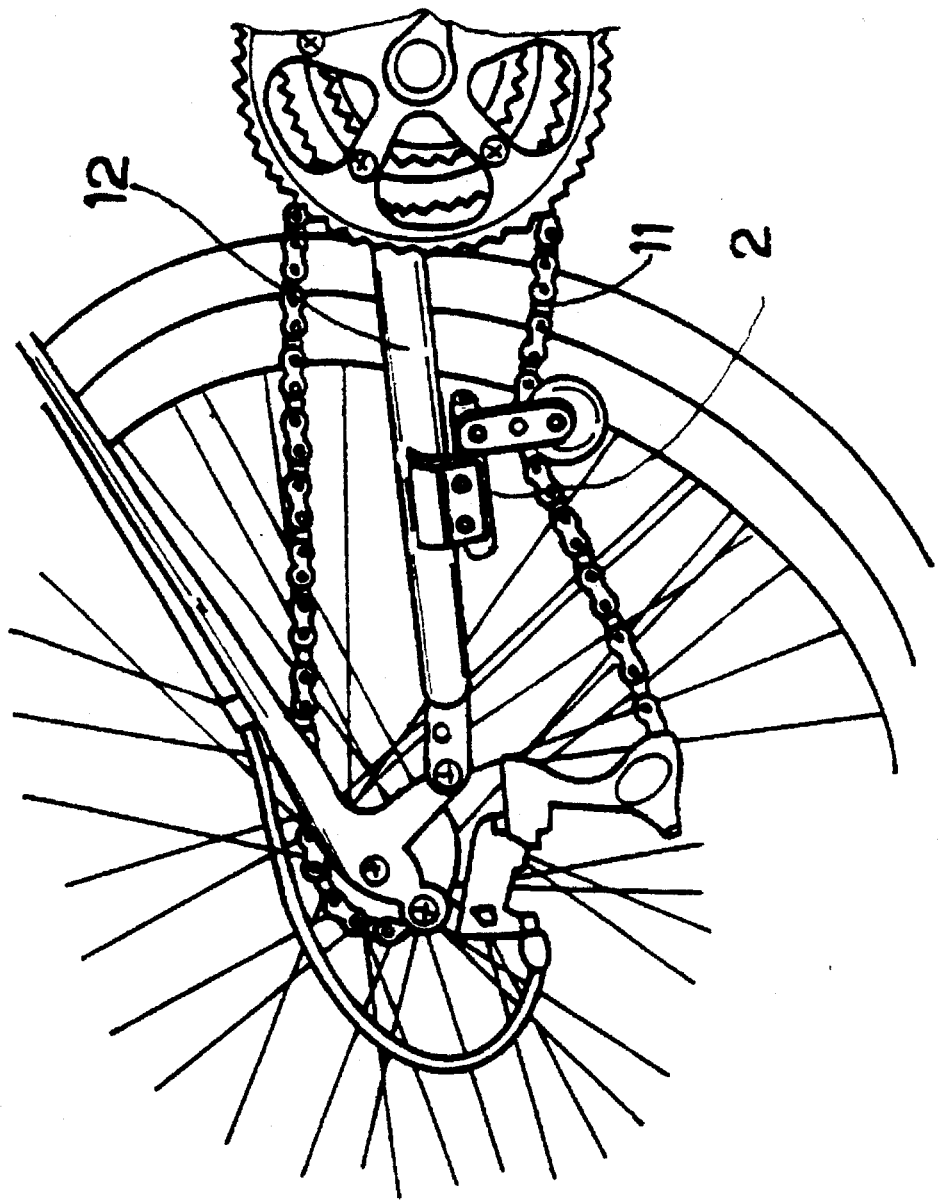
FIG. 2 shows a schematic view of a device of the present invention for pressing a bicycle drive chain.
Figure 3:
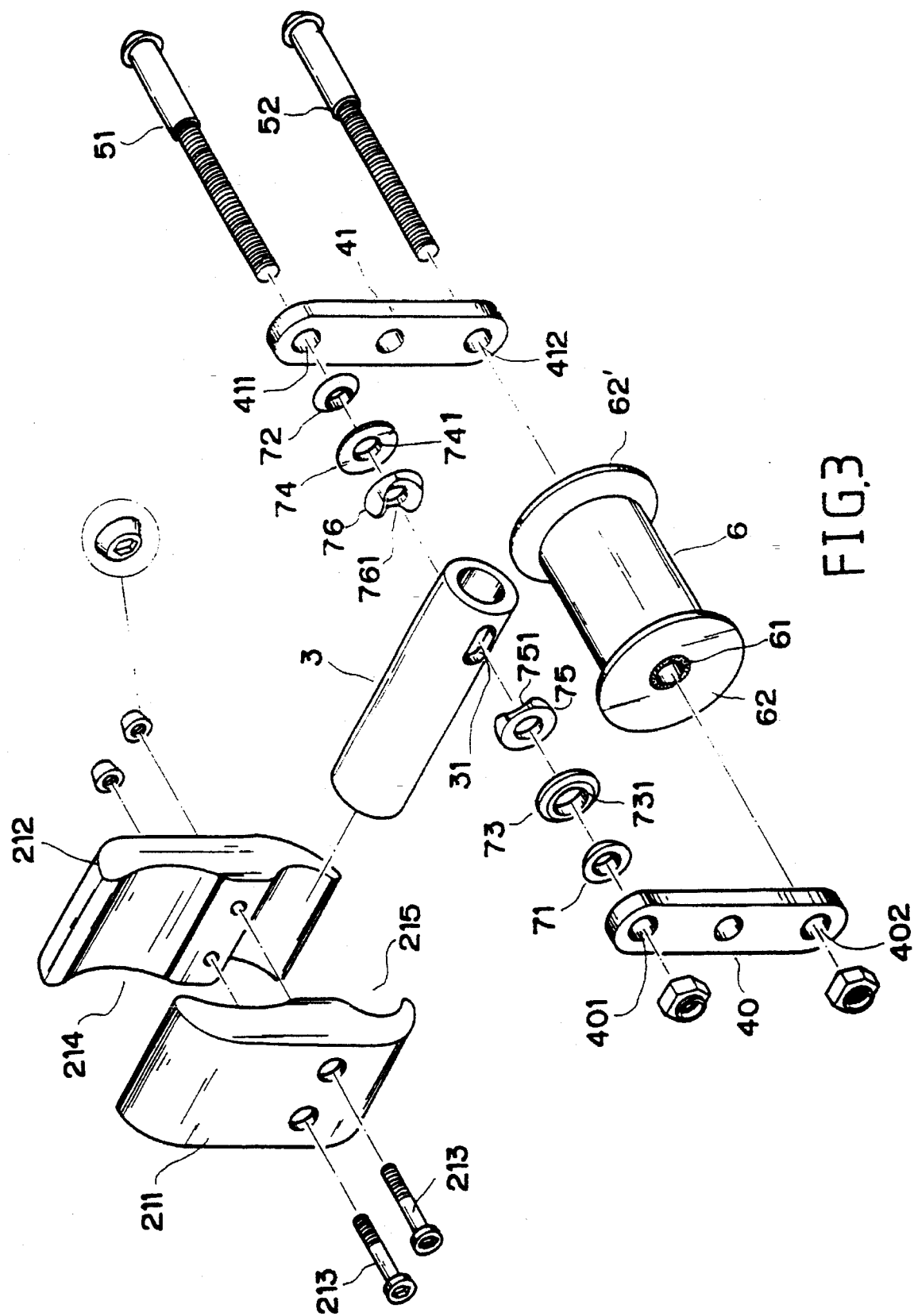
FIG. 3 shows an exploded view of the device of the present invention for pressing a bicycle drive chain.

As shown in FIGS. 2 and 3, an adjustable device 2 of the first preferred embodiment of the present invention for pressing a bicycle drive chain 11 comprises the component parts which are described explicitly hereinafter.

A fastening seat 21 comprises two fastening pieces 211 and 212, which are held together by two fastening bolts 213 such that an upper pressing hole 214 and a lower pressing hole 215 are formed therebetween.

A shaft 3 of a tubular construction is provided in the wall of one end thereof with a through hole 31.

Two support arms 40 and 41 are similar in construction and dimension and are provided respectively and correspondingly with two through holes 401, 402 and 411, 412.

Two threaded pivots 51 and 52 are engageable respectively with the through holes 401, 402, 411 and 412 of the two support arms 40 and 41.

A pressing wheel 6 has an axial hole provided with a bushing 61 and has two protecting flanges 62 and 62' which are located at both ends thereof.

Two rotary seats 7 comprise two semicircular bodies 71 and 72, and two cushioning bodies 73, 74. The two cushioning bodies 73 and 74 are provided respectively with arcuate slots 731, 741. The two rotary seats 7 further comprise two cushioning pieces 75 and 76 which have respectively arcuate recesses 751 and 761.

In combination, a bicycle side frame 12 is clamped by the upper pressing hole 214 of the fastening seat 21. One end of the shaft 3 is held in the lower pressing hole 215 of the fastening seat 21 while another end of the shaft 3 is pivoted to the upper pivot 51 engageable with the through hole 31 of the shaft 3, two support arms 40 and 41, and two rotary seats 7, The pressing wheel 6 is mounted on the lower pivot 52 engageable with the lower through holes 402, 412 of the two support arms 40 and 41 such that the pressing wheel 6 is capable of moving at various angles on the shaft 3 acting as an axis. As a result, the drive chain 11 can be effectively pressed.

Figure 4:
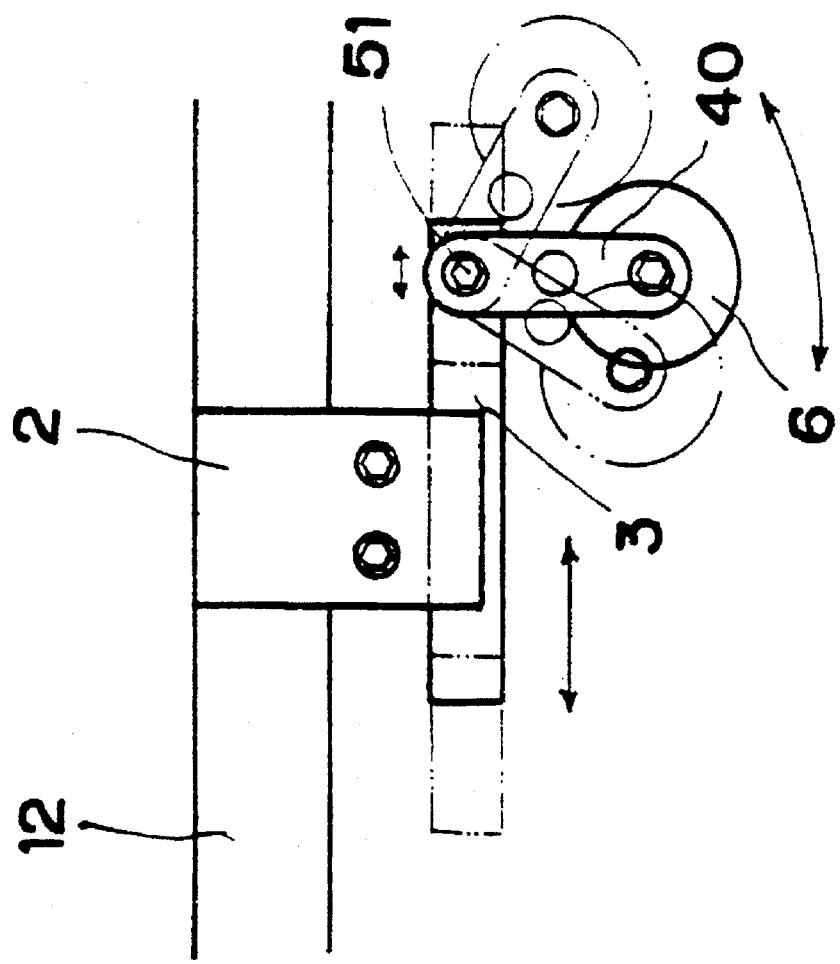
FIG. 4 shows a schematic view of a first preferred embodiment of the present invention.

As illustrated in FIG. 4, two support arms 40 and 41 can be rotated on the shaft 3 acting as an axis. The shaft 3 can be moved back and forth in the lower pressing hole 215 of the fastening seat 21 so as to release the upper pivot 51 which can be then adjusted for its position in accordance with the length of the through hole 31 of the shaft 3.

Figure 5:
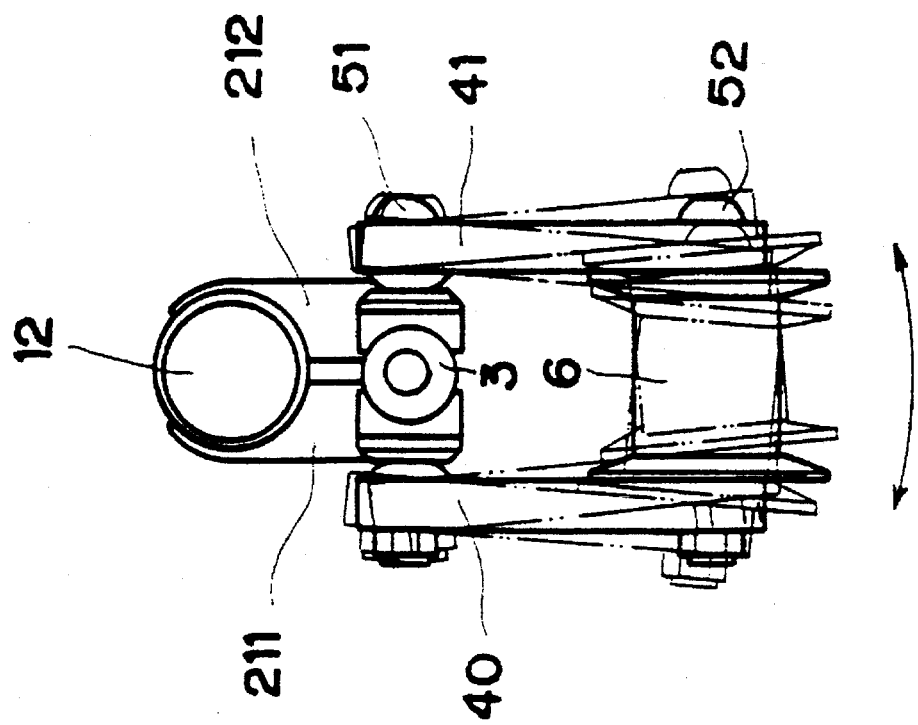
FIG. 5 shows another schematic view of the first preferred embodiment of the present invention.

As illustrated in FIG. 5, the support arms 40,41 and the pressing wheel 6 can be tilted on the shaft 3 acting as an axis so that the drive chain 11 can be pressed steadily.

Figure 6:
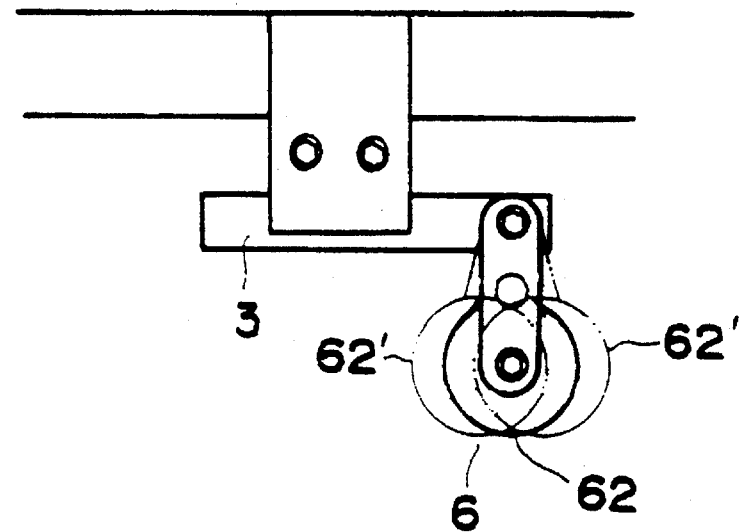
FIG. 6 shows still another schematic view of the first preferred embodiment of the present invention.

The rotary seats 7 can be partially tilted, thanks to the pressing wheel 6 and the through hole 31 of the shaft 3, as shown in FIG. 6.

Figure 7:
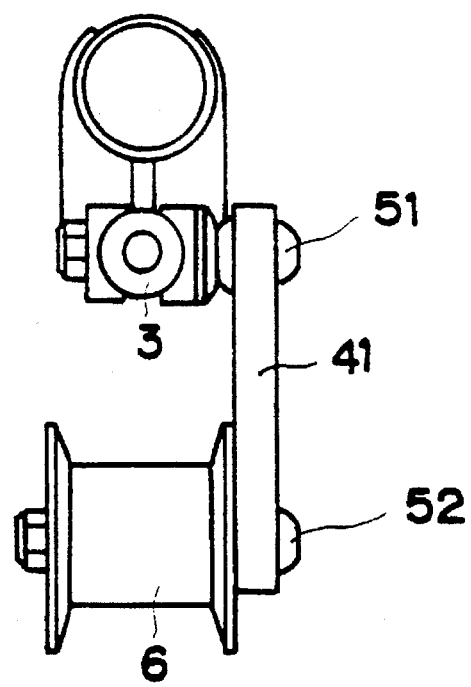
FIG. 7 shows a schematic view of a second preferred embodiment of the present invention.

As shown in FIG. 7, the second preferred embodiment of the present invention is different from the first preferred embodiment in that the former is provided with only one support arm 41.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An adjustable device for pressing a bicycle drive chain comprising:

a fastening seat comprising two separated fastening pieces held together by a fastening bolt such that an upper pressing hole and a lower pressing hole are formed therebetween, said upper pressing hole being so dimensioned as to hold therein securely a side frame of a bicycle frame;

a shaft of a tubular construction and provided with a through hole, said shaft having one end which is held securely in said lower pressing hole of said fastening seat;

two support arms provided respectively with an upper through hole and a lower through hole;

an upper pivot and a lower pivot, said upper pivot being engageable with said through hole of said shaft and said upper through holes of said two support arms;

a pressing wheel having an axial hole provided therein with a bushing, said pressing wheel having respectively at both ends thereof a protecting flange, said pressing wheel mounted on said lower pivot engageable with said axial hole and said lower through holes of said two support arms such that said pressing wheel can be tilted so as to press effectively a bicycle drive chain; and two rotary seats of a semicircular construction and provided respectively with an arcuate slot engageable with said upper pivot, said two rotary seats located respectively between said shaft and said two support arms.

2. The adjustable device according to claim 1 wherein said shaft and said pressing wheel are supported by only one support arm.

* * * * *